Oct. 20, 1964          H. L. FRICK          3,153,407
ROTARY COOKING TOP FOR A HOME APPLIANCE
Filed Aug. 22, 1961          5 Sheets-Sheet 2
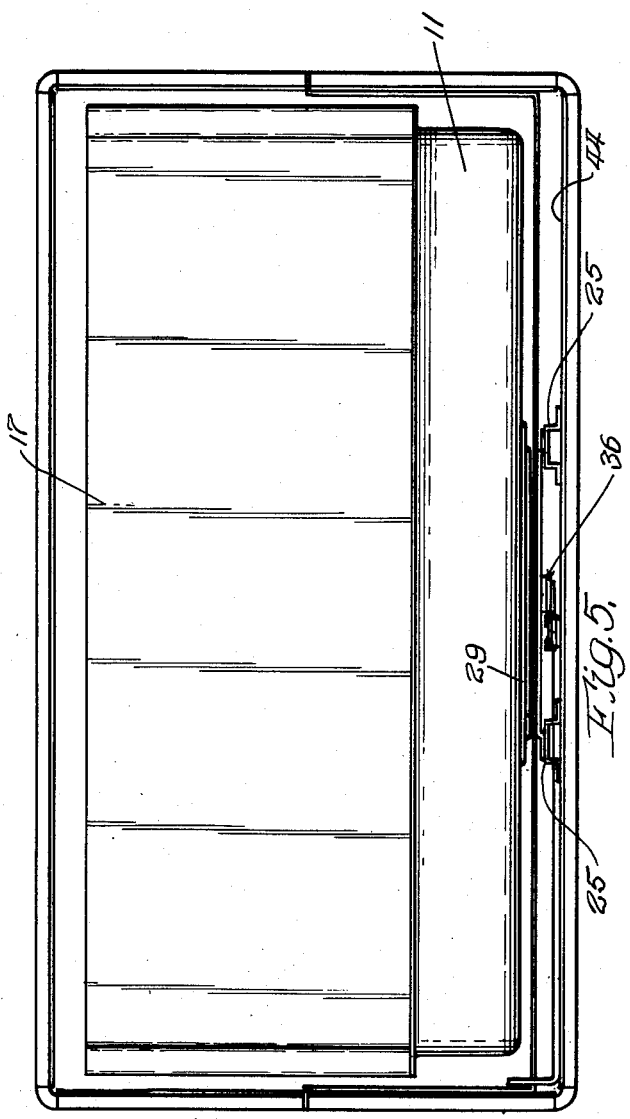
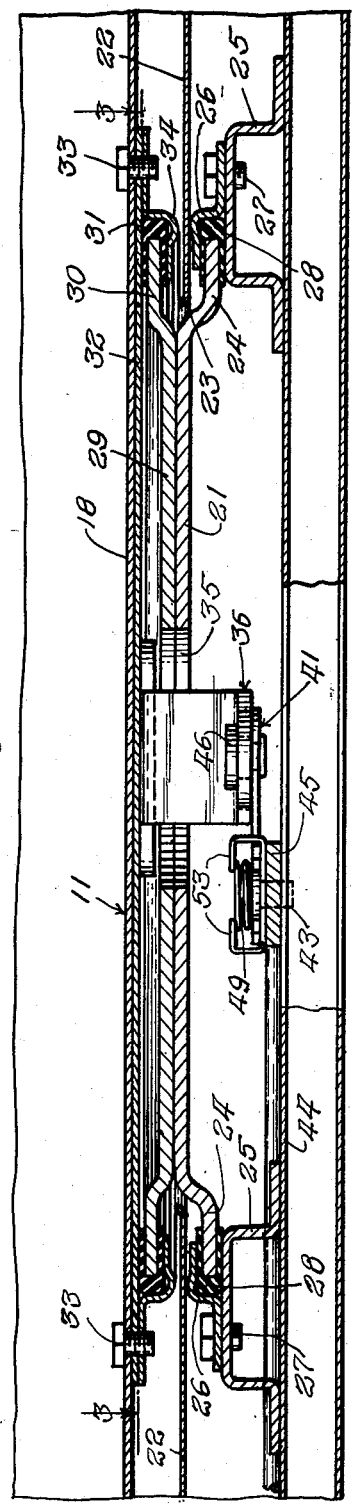

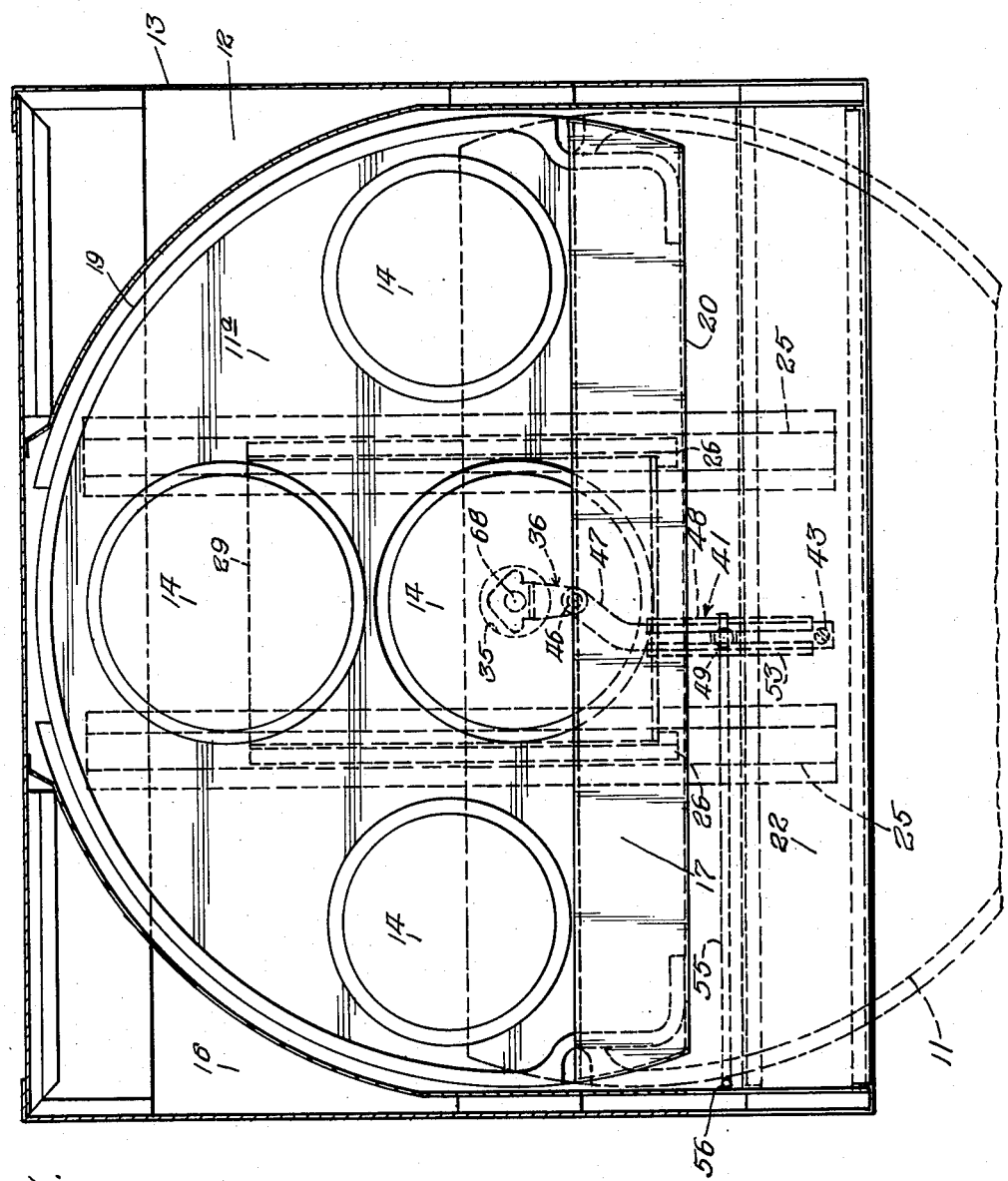

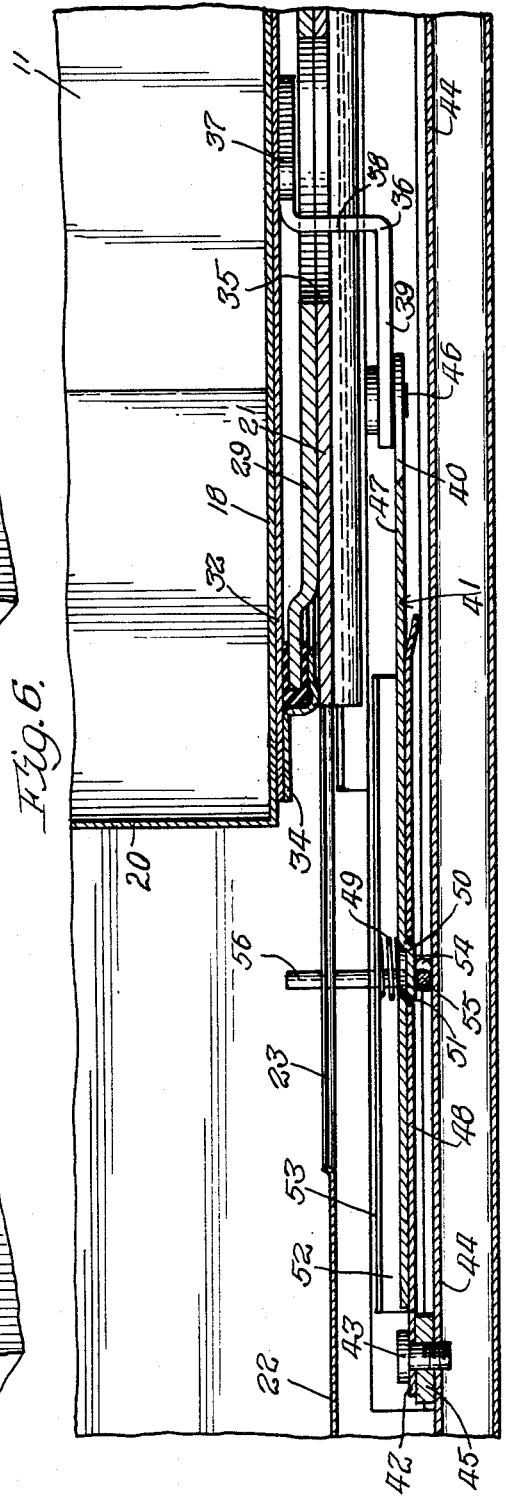

Oct. 20, 1964 H. L. FRICK 3,153,407
ROTARY COOKING TOP FOR A HOME APPLIANCE
Filed Aug. 22, 1961 5 Sheets-Sheet 5

United States Patent Office 3,153,407
Patented Oct. 20, 1964

3,153,407
ROTARY COOKING TOP FOR A HOME
APPLIANCE
Harold L. Frick, Hamilton, Ohio, assignor to Whirlpool
 Corporation, a corporation of Delaware
Filed Aug. 22, 1961, Ser. No. 133,237
19 Claims. (Cl. 126—37)

This invention relates to a kitchen appliance having a rotatable cooking member containing a cooking unit such as a cook top that is movable from and to a storage position.

In the appliance of this invention there is provided a cooking member such as a cook top containing a cooking unit or units such as burners with the cooking member being in a storage position to conceal the cooking units when not in use, but being movable from this storage position to a projected position. This projected position may be attained by employing means for simultaneously rotating the cooking member and moving member forwardly to a projected position for use or may be merely by rotating the cooking member. In either alternative the cooking unit or units such as the burners are moved into a position for ready access for use in preparing food and the like.

One of the features of this invention is to provide such a cooking member having improved means for moving the member from a retracted position such as a storage position to a projected position for use, with this moving being achieved either by rotating the member or by simultaneously rotating the member and projecting the member forwardly into position for use from a retracted storage position.

Other features and advantages of the invention will be apparent from the following description of certain embodiments of the invention as shown in the accompanying drawings. Of the drawings:

FIGURE 1 is a plan view of a kitchen appliance embodying the invention shown in the retracted position with the rotated and projected position of the appliance being shown in broken lines.

FIGURE 2 is a front elevational view of the embodiment of FIGURE 1.

FIGURE 5 is a fragmentary enlarged vertical sectional view taken substantially along line 5—5 of FIGURE 4.

FIGURE 6 is a vertical sectional view taken substantially along line 6—6 of FIGURE 3.

FIGURE 7 is a fragmentary perspective view illustrating means forming a storage recess for the kitchen appliance embodiment with the appliance being hidden from view in this recess.

FIGURE 8 is a view similar to FIGURE 7 but with the cooking top of the appliance being moved to forwardly projecting position preparatory to use.

Figure 3:
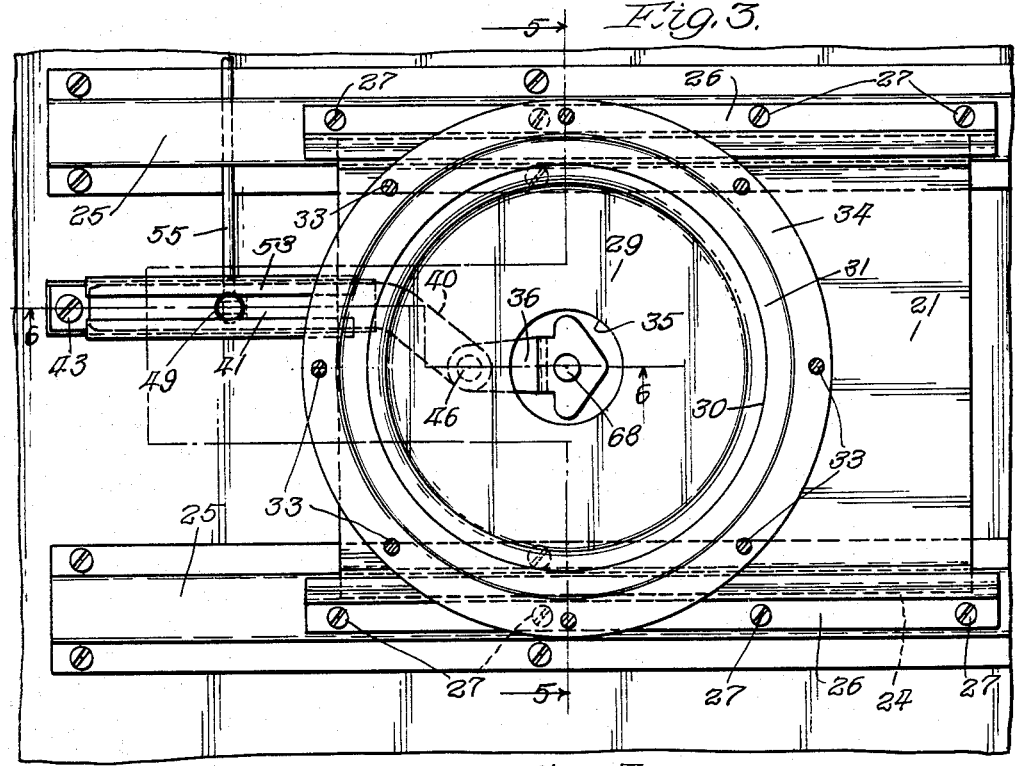
FIGURE 3 is a fragmentary sectional plan view taken substantially along line 3—3 of FIGURE 5 but omitting the lower shelf member or portion 22.

In the embodiment of FIGURES 1–8 inclusive there is provided a rotatable cook top 11 with an upstanding back member 17 (FIGURE 2) located in the chamber 12 of a cabinet 13 (FIGURE 1). The cook top 11 includes a horizontal shelf 11a provided with four cooking units or burners which may be either gas or electric and which as indicated at 14 (FIGURE 8) are electric. The counter tops 15 have a recessed cabinet area 16 between them. Between the counter tops, cook top 11, supported by cabinet 13, is moved into position for use of the cooking units 14.

As shown in FIGURE 8 the rear of the essentially semi-circular cook top 11 is provided with a vertical back member 17 which when the cook top 11 is in operating position acts as a splash guard. Then, when the cooking unit 11 has been moved to storage position within the chamber 12 the upstanding back member 17 serves to close off the chamber and hide the shelf 11a and cooking units 14 from view. The exposed side of the upstanding back member 17 when the cook top 11 is in storage position (FIGURE 7) may include a decorative panel. The side of the member 17 adjacent the cook top 11 may be of metal to serve as a splash guard.

The cook top 11 is provided with a sheet metal bottom 18 and curved sides 19 (FIGURE 6). At the rear of the cook top when in projected position there is provided a straight side 20 (FIGURE 1) in the form of a chord of a circle defined by the curved side 19. The back member 17 extends upwardly from this straight side 20.

The cook top 11 and associated structure provide an apparatus in which the cook top may be rotated in an arcuate motion substantially 180° from the storage position of FIGURE 7 to the projecting or working position shown in FIGURE 8. During this rotation the cook top 11 is also projected forwardly. Means are also provided for disconnecting the apparatus that provides the forward projection if desired.

In the embodiment FIGURES 1–8 there is provided a guide apparatus for guiding the cook top in these movements. This guide apparatus comprises a first guide member 21 in the form of a rectangular metal plate (FIGURES 1 and 3–6) located beneath the bottom of the cook top 11 and hidden from view beneath a lower shelf member 22 which forms the bottom of the recess 16. The guide apparatus which includes the first guide member 21 projects through an opening 23 (FIGURE 5) in the lower shelf member 22.

The first guide member 21 of rectangular shape is provided with spaced sides 24 that are displaced downwardly from the plane of the remainder of this guide member as illustrated in FIGURE 5. These sides are provided on the top, bottom and edges with an enclosing solid plastic bearing material 28 which may be Delron, Teflon, nylon or some other heat resistant bearing material. These sides 24 of the rectangular first guide member 21 are supported on substantially parallel raised slide supports 25 which extend forwardly and rearwardly of the recess 16 (FIGURE 1). The spaced sides of the member 21 are held for sliding movement on the tops of the slide supports 25 by brackets 26 held in position by a plurality of screws 27 (FIGURE 5). The brackets 26 do not bind the bearing material 28 but serve only as guides for the movement along the slide supports 25. Members 25 and 26 in effect form guide tracks for accommodating translatory movements of guide member 21.

Figure 4:
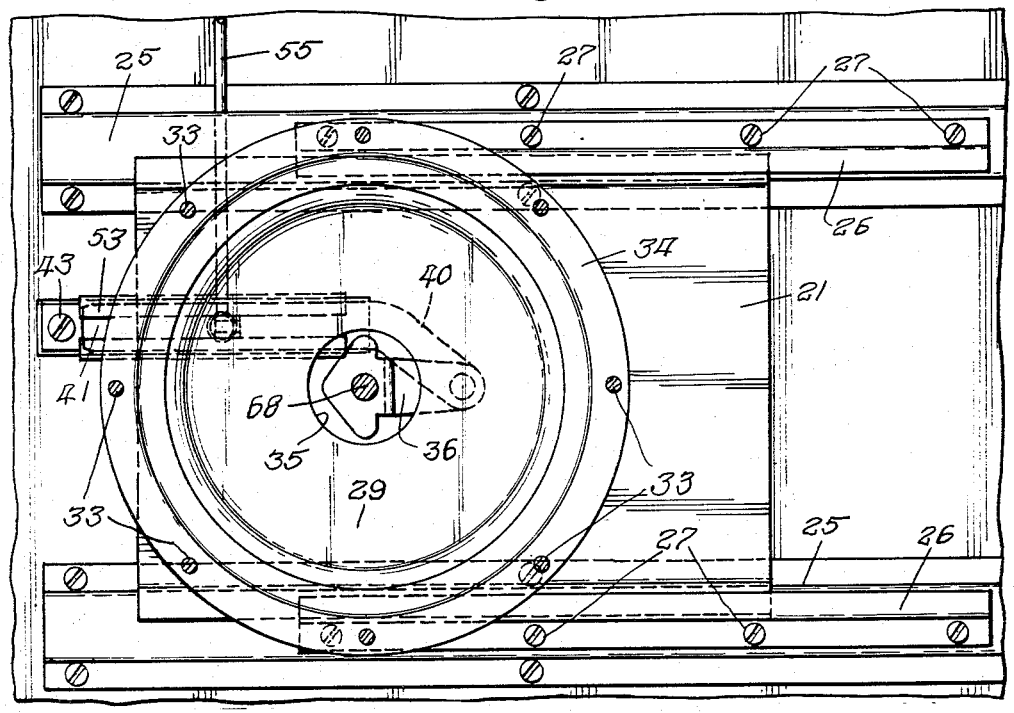
FIGURE 4 is a view similar to FIGURE 3 but showing the parts in rotated projected position.

Attached to the top of the first guide member 21 is a second guide member 29 which is of circular shape (FIGURES 3–5). As can be seen, particularly in FIGURE 5, the width of the second member 29 is substantially the same as the width of the rectangular first guide member 21. This second guide member 29 also has a peripheral flange 30 that is here formed upwardly from the plane of the remainder of the guide member and this circular flange or edge 30 is also provided with a heat resistant bearing material 31 similar to the bearing material 28. Located between the edge 30 of the second guide member 29 and the bottom 18 of the cook top is a bearing plate 32 that is generally circular and that is attached to the bottom of the cook top as by screws 33. The plate 32 may be of the same material as the slide supports 25. The screws 33 also engage the outer edge and hold in position a guide bracket 34 of circular shape and which embraces the bearing material 31 but likewise does not bind it so that the cook top 11 is rotatable on the bearing 31 with this rotation being guided by the bracket 34. The first and second guide members comprise a main guide member or means for guiding movement of the cook surface between projecting and retracted positions in association with other elements such as the guide supports and bearing material.

The two guide members 21 and 29 which are attached together are provided with a common opening 35 at the center of the second guide member 29 and forwardly of the center of the first guide member 21 as shown in FIGURES 3 and 4. In order to simultaneously project the cook top 11 forwardly when it is rotated from the position in FIGURE 7 to the position in FIGURE 8, where such is desired, there is provided a crank and link system for moving the cook top from its retracted position to its projecting position upon rotation of the cook top. In the illustrated embodiment this crank and link system comprises a crank element 36 having one end 37 (FIGURE 6) attached to the bottom of the plate 32 inwardly of the straight edge 20 of cook top 11, an intermediate vertical portion 38 extending downwardly through the opening 35 and another end 39 extending away from the vertical portion 38 in the direction opposite to the direction of the one end 37. The crank 36 is so positioned with relation to the cook top 11 that when the cook top is in its retracted position as shown in FIGURE 1 the crank 36 will extend forwardly or toward the front. It should be noted that it is within the scope of my invention to substitute other motion converting units for crank 36 and link 41 to provide the reciprocatory component for shelf 11a. For example, an eccentric cam may be substituted for crank 36 and an encompassing strap follower attached to a pitman may be used to replace link 41.

Attached to the outer end of the portion 39 (FIGURE 6) is one end 40 of a reaction link or lever element 41. The opposite end 42 of the link 41 is hinged or rotatably attached by means of a screw 43 (shown in phantom in FIGURE 6) to the base member 44 which forms the bottom of the unit and on which the slide supports 25 are mounted (FIGURE 5). This end 42 of the link 41 is supported above this base member 44 by means of a spacer block 45 (FIGURE 6). The first end 40 of the link 41 is also hinged or rotatably attached to the end 39 of the crank 36 as by means of a screw 46. The link element 41 is constructed in two interlocking parts 47 and 48 each made up of an elongated metal strip with the first part 47 containing the hinged end 40 and overlying the other part 48 which contains the opposite hinged end 42.

The two link parts 47 and 48 are normally held together in interlocking relationship for operation as a single element by means of a manually operable disabling mechanism including a compression spring 49 pressing a projecting portion 50 of the link part 47 into an opening 51 in the other link 48. This spring is held in position by providing the link part 48 with upstanding slides 52 and overhanging flanges 53 that extend toward each other and against the inner surfaces of which the spring 49 bears. In order to release the two link parts 47 and 49 by this disabling mechanism there is provided a cam 54 engaging the bottom of the projection 50 and mounted on an axially rotatable rod 55 extending to a point outside the cook top 11 and provided with an unwardly extending handle 56. When the rod 55 is rotated in a counterclockwise direction as viewed in FIGURE 6 by depressing the handle 56 of the disabling mechanism the cam 54 moves upwardly to move the projection 50 out of the opening 51 and thus release the two link parts 47 and 48. Normally, however, the parts will be in the position shown in FIGURE 6 so that the link 47 operates as a single link.

The end 40 of the link element 41 is bent or offset as illustrated in FIGURE 1. The purpose of the bending will be explained hereinafter in the description of the operation of the appliance.

When the cook top is in stored position, as shown in FIGURES 1, 3, 6 and 7, the crank 36 and lever 41 extend away from each other. When it is desired to move the cook top 11 into operating or forwardly projecting position, the cook top 11 is rotated from the storage position to a projecting position as shown in FIGURES 4 and 8. When this occurs the cook top rotates on the circular bearing material 31 of the second guide member 29 and is held against sideways displacement by the bracket 34. This rotation moves the pivot point defined by the screw 46 to the left as viewed in FIGURE 1 and upwardly as viewed in FIGURE 3 because of the eccentricity of crank 36. In doing this the link 41 of course moves through an arc about its pivot point defined by the screw 43. Then, as rotation is continued through 180° to move the cook top 11 to the operative projecting position of FIGURE 8, the cook top is simultaneously moved forwardly because the end 42 of the link 41 is pivotally restrained by the pivot screw 43 to crank 36. When the cook top has been rotated to its forwardmost operating position, the crank 36 is against the link 41 with both extending in substantially the same direction. In other words, the cam and link mechanism formed by parts 36 and 41 provide a reaction mechanism for producing a translatory movement of shelf 11a during its arcuate movements so as to produce a resultant compound arcuate and translatory motion of shelf 11a.

During the rotation of the cook top the entire unit slides forwardly on the slide supports 25. During this sliding movement lateral displacement of the cook top is prevented by the guide brackets 26. If it is desired merely to rotate the cook top on the second guide member 29 without moving the cook top forwardly the cam 54 is operated as previously described to disengage the extensible link parts 47 and 48 of the link 41. As pointed out previously this causes raising of the projection 50 from the opening 51. When this has occurred rotation of the cook top will cause relative movement of the parts 47 and 48 and thus extending or lengthening of the link 41 so that there will be no corresponding forward movement. Then when the cook top is rotated back to storage position the projection 50 will automatically engage the opening 51. Link parts 47 and 48 can in this way be released from their interlocking relationship by this disabling mechanism which prevents reaction forces from being exerted on the stationary pivot pin 43 and thereby eliminates the translatory component from cook top 11 during its rotation.

Figure 9:
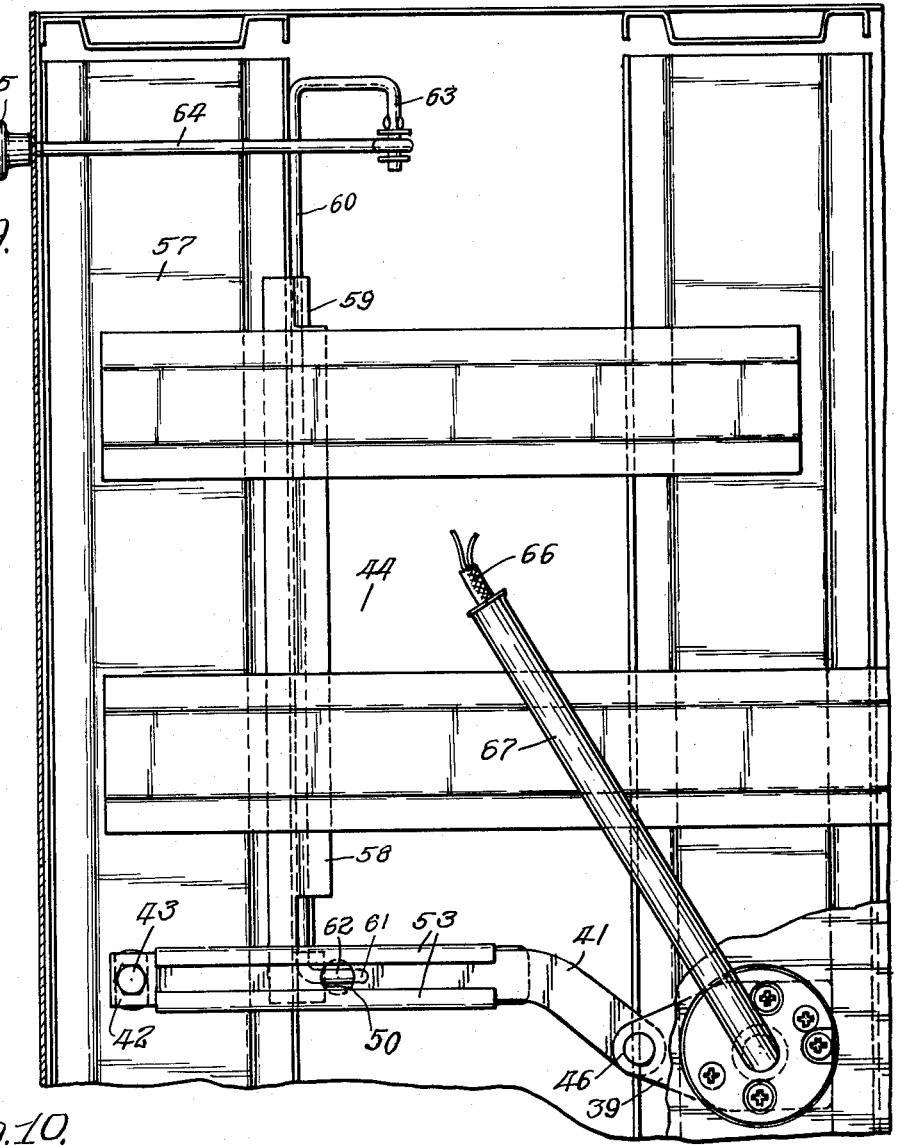
FIGURE 9 is a view illustrating a second embodiment of the invention, similar to the left side of FIGURE 3 that illustrates the first embodiment, and broken away for clarity of illustration.
Figure 10:
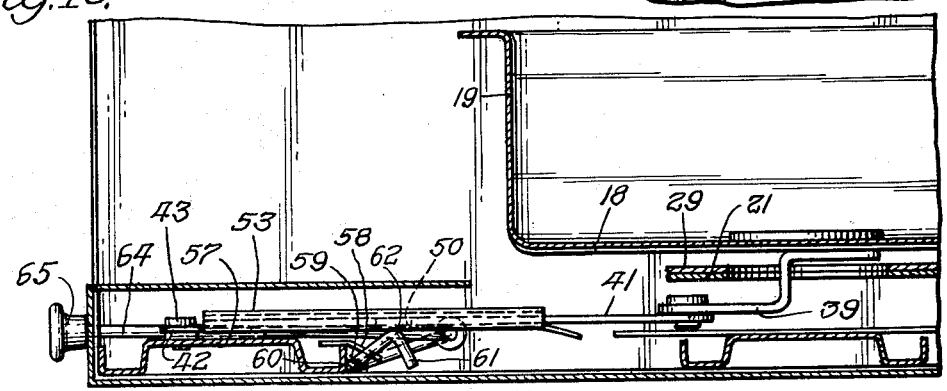
FIGURE 10 is a vertical sectional view broken away for clarity of illustration taken adjacent the lower end of FIGURE 9.

The second embodiment of FIGURES 9 and 10 illustrates another arrangement for releasing the extensible link parts 47 and 48. In this arrangement the base member 44 is provided with a raised support bracket 57 extending across its front. Immediately on the rear of this bracket 57 there is provided a flange 58 and a second flange 59 which retain in position an axially rotatable rod 60 in the form of a wire. This wire extends transversely of the unit and has one end 61 bent to form a crank 62 and the other end bent to form a crank 63. Attached to the extreme end of this crank 63 is a longitudinally movable operating member 64 projecting through the front of the device and provided with a knob 65. When it is desired to release the two parts 47 and 48 of link 41 it is merely necessary to pull forwardly on the knob 65. This rotates the rod 60 about its axis and raises the crank 62 to move the projection 50 from the opening 51. Thus the operation of this embodiment performs precisely the same function as the release mechanism of the first embodiment.

An electrical conduit 66, leading from an electrical source (not shown), is fed into tube 67 which is attached to the underside of bottom 18. From tube 67, electrical conduit 66 extends through opening 68 in the bottom 18 and connects to the electrical elements 14 (FIGURE 1).

Referring to FIGURES 3, 4, and 9 the offset end 40 of the link 41 permits clearance for tube 67 while the cook top 11 is in the operative position. If link 41 was to be placed on the horizontal centerline, as viewed in FIGURE 4, it would contact tube 67 (not shown in this view) which is beneath and concentric with opening 68 and would not allow a full 180° rotation. However, by offsetting link 41 clearance is maintained and a full 180° rotation is insured.

It will be noted that in both embodiments of my invention the resultant compound rotary and translatory motion of cook top 11 as produced by rotation of cook top 11 is made possible by the circular guide 34 which accommodates the rotary motion imparted to guide plate 29 and by the side supports 25 and spaced guides 26 which accommodate the translatory movement of plate 21 which is caused to move in a linear motion as a result of the reaction forces imposed by this rotational movement on the crank-link system 36, 47, and 48 through the shiftable pivot pin 46 and the stationary pivot pin 43. In both embodiments this resultant motion can be changed to pure rotary motion by a disabling mechanism capable of disconnecting the rigid interlocking of members 47 and 48 of the compound link formed by these two members.

Having described my invention as related to the embodiments shown in the accompanying drawings, it is my intention that the invention be not limited by any of the details of description, unless otherwise specified, but rather be construed broadly within its spirit and scope as set out in the accompanying claims.

I claim:

1. A kitchen appliance, comprising: means forming a chamber; a cooking member containing a cooking unit, said cooking member being in said chamber when in storage position; and means mounting said cooking member for compound movement including means for rotating said cooking member to move said unit into operative position and means coactive therewith for projecting said cooking member to a position forwardly of said chamber.

2. A kitchen appliance, comprising: means forming a chamber; a cooking member containing a cooking unit, said member being in said chamber when in storage position; means mounting said cooking member for simultaneous rotary movement of said cooking member to move said unit into operative position and translatory movement to move said cooking member to a position forwardly of said chamber; and a substantially vertical back member on said cooking member, said back member being disposed on the rear of said cooking member when said cooking member is in said forwardly projected position, said back member being adapted to close said chamber to conceal said cooking unit when said cooking member is in said storage position.

3. A kitchen appliance, comprising: a cooking member containing a cooking unit, means mounting said cooking member for movement in a path rearwardly and forwardly between retracted and projected positions and for rotation about an axis; a base member; guiding means for guiding movement of said cooking member between said positions; and a motion converting system having a crank operatively attached to said cooking member and a link element pivotally attached to said base member and pivotally connected to said crank for moving said cooking member between said positions upon rotary movement of said cooking member.

4. Cooking apparatus comprising: a cabinet including means defining a chamber therein; a movable unit including an upstanding member and a shelf mounting a cooking unit therein; and slide means rotatably carrying said movable unit and mounting said movable unit for substantially straight guided movement between an operative position exposing said cooking unit for use and a storage position in which said shelf is received in said chamber, said upstanding member being of sufficient extent to close said chamber with said unit in storage position.

5. Cooking apparatus comprising: a cabinet including means defining a chamber therein; a movable unit including an upstanding closure member adapted to close said chamber and a shelf mounting a cooking unit therein; and means including a motion converting mechanism for mounting said movable unit for translatory movement between on operative projected position exposing said cooking unit for use and a retracted storage position in which said shelf is received in said chamber and in which said chamber is closed by said upstanding member said motion converting mechanism causing rotation of said movable unit during said translatory movement.

6. Cooking apparatus comprising: a base member; guide tracks on said base member; a main guide member including a first guide member mounted in said guide tracks for translatory movements therein and a second guide member affixed to said first guide member; a shelf having a cooking unit therein and mounted for rotation relative to said second guide member; guide means affixed to said shelf and arranged to accommodate rotary movements of said shelf relative to said second guide member; a link pivotally connected to said base member; and a crank attached to said shelf and pivotally connected to said link to cause a translatory movement of said first guide member in said guide tracks during rotary movement of said shelf so as to produce a resultant compound rotary and translatory movement of said shelf relative to said base member.

7. The invention set forth in claim 6 in which said link comprises two normally interconnected members and in which said cooking apparatus further includes a disabling mechanism cooperating with said two normally interconnected members to permit selective disconnection of said two members for elimination of translatory movement of said shelf during its rotary movement.

8. A kitchen appliance, comprising: a base member; a cooking member containing a cooking unit, means mounting said cooking member for movement in a path rearwardly and forwardly between retracted and projecting positions relative to said base member and for rotation about an axis; guiding means for guiding movement of said cooking member between said positions; a crank attached to said cooking member for rotation therewith and having one portion extending forwardly when said cooking member is in said retracted position; and a link having one portion pivotally attached to said one portion of said crank and a second portion pivotally attached to said base member, rotation of said cooking member thereby causing said crank to pull said cooking member toward said projecting position.

9. A kitchen appliance, comprising: a base member; a cooking member containing a cooking unit, said cooking member being movable in a path rearwardly and forwardly between retracted and projecting positions relative to said base member and being rotatable about an axis; guiding means for guiding movement of said cooking member between said positions; a crank attached to said cooking member for rotation therewith and having one portion extending forwardly when said cooking member is in said retracted position; a link having one portion pivotally attached to said one portion of said crank and a second portion pivotally attached to said base member forwardly of said crank, said link comprising two parts arranged for relatively extensible and retractable movement; and releasable means holding said parts against said extensible and retractable movement, rotation of said cooking member thereby causing said crank to pull said cooking member toward said projecting position only when said parts are thusly held by said releasable means.

10. A kitchen appliance, comprising: a base member; a cooking member containing a cooking unit, said cooking member being movable in a path rearwardly and forwardly between retracted and projecting positions relative to said base member and being rotatable about an axis; main guide means including first and second guide members, said first guide member having spaced guide portions; a pair of spaced supporting members supporting said guide portions for movement of said first guide member in a path generally parallel to the path of said cooking member between retracted and projecting positions relative to said base member, said second guide member connected to and carried by said first guide member; means mounting said cooking member for rotation on said second guide member; a crank attached to said cooking member; and a link element pivotally attached to said base member and to said crank for moving said cooking member into said projecting position from said retracted position upon rotary movement of said cooking member.

11. A kitchen appliance, comprising: a base member; a cooking member containing a cooking unit, said cooking member being movable in a path rearwardly and forwardly between retracted and projecting positions relative to said base member and being rotatable about an axis; main guide means including first and second guide members, said first guide member having a pair of oppositely located spaced side guide portions; a pair of spaced supporting members supporting said guide portions for movement of said first guide member in a path generally parallel to the path of said cooking member between retracted and projecting positions relative to said base member, said second guide member attached to said first guide member; means mounting said cooking member for rotation on said second guide member; and means interconnected between said cooking member and said base member for moving said cooking member into said projecting position from said retracted position upon rotary movement of said cooking member.

12. A kitchen appliance, comprising: a base member; a cooking member containing a cooking unit, said cooking member being movable in a path rearwardly and forwardly between retracted and projecting positions relative to said base member and being rotatable about an axis; main guide means including first and second guide members, said first guide member having a pair of oppositely located spaced side guide portions; a pair of spaced supporting members supporting said guide portions for movement of said first guide member in a path generally parallel to the path of said cooking member between retracted and projecting positions relative to said base member, said side guide portions being substantially parallel and said supporting members being substantially parallel, said second guide member attached to said first guide member; means mounting said cooking member for rotation on said second guide member; and means interconnected between said cooking member and said base member for moving said cooking member into its projecting position from its retracted position upon rotary movement of said cooking member.

13. A kitchen appliance, comprising: a base member; a cooking member containing a cooking unit, said cooking member being movable in a path rearwardly and forwardly between retracted and projecting positions relative to said base member and being rotatable about an axis; main guide means including first and second guide members, said first guide member having spaced guide portions; a pair of spaced supporting members supporting said guide portions for movement of said first guide member in a path generally parallel to the path of said cooking member between retracted and projecting positions relative to said base member, said second guide member connected to and movable with said first guide member; means mounting said cooking member for rotation on said second guide member; a crank attached to said cooking member for rotation therewith and having an end portion extending forwardly when said cooking member is in said retracted position; and a link having one end pivotally attached to said crank end portion and a second portion of said link pivotally attached to said base member forwardly of said crank for moving said cooking member into said projecting position from said retracted position upon rotary movement of said cooking member.

14. A kitchen appliance, comprising: a base member; a cooking member containing a cooking unit, said cooking member being movable in a path rearwardly and forwardly between retracted and projecting positions relative to said base member and being rotatable about an axis; main guide means including first and second guide members, said first guide member having spaced guide portions; a pair of spaced supporting members supporting said guide portions for movement of said first guide member in a path generally parallel to the path of said cooking member between retracted and projecting positions relative to said base member, said second guide member connected to and movable with said first guide member; means mounting said cooking member for rotation on said second guide member; a crank attached to said cooking member for rotation therewith and having an end portion extending forwardly when said said cooking member is in said retracted position; an extensible link having one end pivotally attached to said crank end portion and a second end of said link pivotally attached to said base member forwardly of said crank, said extensible link comprising two parts arranged for relatively extensible and retractable movement; and releasable means holding said parts against said extensible and retractable movement, rotation of said cooking member thereby causing said crank to move to pull said cooking member toward said projecting position only when said parts are thusly held by said releasable means.

15. A kitchen appliance, comprising: a base member; a cooking member containing a cooking unit, said cooking member being movable in a path rearwardly and forwardly between retracted and projecting positions relative to said base member and being rotatable about an axis; main guide means including first and second guide members, said first guide member having a pair of oppositely located spaced side guide portions; a pair of spaced supporting members supporting said guide portions for movement of said first guide member in a path generally parallel to the path of said cooking member between retracted and projecting positions relative to said base member, said side guide portions being substantially parallel and said supporting members being substantially parallel, said second guide member attached to said first guide member; means mounting said cooking member for rotation on said second guide member; a crank attached to said cooking member for rotation therewith and having an end portion extending forwardly when said cooking member is in said retracted position; and a link having one end portion pivotally attached to said crank end portion and a second end portion of said link pivotally attached to said base member forwardly of said crank, rotation of said cooking member thereby causing said crank to pull said cooking member toward said projecting position.

16. A kitchen appliance, comprising: a base member; a cooking member containing a cooking unit, said cooking member being movable in a path rearwardly and forwardly between retracted and projecting positions relative to said base member and being rotatable about an axis; main guide means including first and second guide members, said first guide member having a pair of oppositely located spaced side guide portions; a pair of spaced supporting members supporting said guide portions for movement of said first guide member in a path generally parallel to the path of said cooking member between retracted and projecting positions relative to said base member, said side guide portions being substantially parallel and said supporting members being substantially parallel, said second guide member attached to and carried by said first guide member; means mounting said cooking member for rotation on said second guide member; a crank attached to said cooking member for rotation therewith and having one end portion extending forwardly when said cooking member is in said retracted position; an extensible link have one end portion pivotally attached to said crank end portion and a second end portion of said link pivotally attached to said base member forwardly of said crank, said extensible link comprising two parts arranged for relatively extensible and retractable movement; and releasable means holding said parts against said extensible and retractable movement, rotation of said cooking member thereby causing said crank to pull said cooking member toward said projection position only when said parts are thusly held by said releasable means.

17. Cooking apparatus for installation in a recess of a countertop comprising: a base member; means forming a chamber; a cooking member containing a cooking unit, said cooking member being movable in a path rearwardly and forwardly between retracted and projecting positions relative to said base member and being rotatable about an axis, said cooking member being positioned in said chamber when in said retracted position; a substantially vertical back member on the rear of said cooking member when said cooking member is in said forwardly projected position, said back member being of sufficient extent and configuration to close said chamber and conceal said cooking unit when said cooking member is in said retracted position; a first guide member having a pair of oppositely located spaced side guide portions; a pair of spaced supporting members supporting said guide portions for movement of said first guide member in said path, said side guide portions being substantially parallel and said supporting members being substantially parallel; a second guide member attached to said first guide member; means mounting said cooking member for rotation on said second guide member; a crank attached to said cooking member for rotation therewith and having one end portion extending forwardly when said cooking member is in said retracted position; an extensible link having one end portion pivotally attached to said crank end portion and a second end portion of said link pivotally attached to said base member forwardly of said crank, said extensible link comprising two parts arranged for relatively extensible and retractable movement; and releasable means holding said parts against said extensible and retractable movement, rotation of said cooking member thereby causing said crank to pull said cooking member toward said projecting position into said recess only when said parts are thusly held by said releasable means.

18. A kitchen appliance, comprising: a cooking member containing a cooking unit and means mounting said cooking member for compound rotary and translatory movement, including rotary movement of said cooking member and generally linear movement of said cooking member between a retracted position for storage and a projected position for use.

19. A kitchen appliance, comprising: a cooking member containing a cooking unit and means mounting said cooking member for movement selective between, as desired: (1) compound movement of said cooking member including rotary movement thereof and movement thereof between a retracted position for storage and a projected position for use and (2) rotary movement only of said cooking member.

References Cited in the file of this patent
UNITED STATES PATENTS

| | | |
|---|---|---|
| 1,153,597 | Buttler | Sept. 14, 1915 |
| 1,291,486 | Grubbs | Jan. 14, 1919 |
| 2,102,616 | Ehret | Dec. 21, 1937 |
| 2,265,421 | Donnelly | Dec. 9, 1941 |
| 2,738,411 | Sandin | Mar. 13, 1956 |
| 2,840,438 | Sharpe | June 24, 1958 |
| 2,905,518 | Doesken | Sept. 22, 1959 |